United States Patent
Stelovsky et al.

(10) Patent No.: US 9,861,895 B2
(45) Date of Patent: Jan. 9, 2018

(54) APPARATUS AND METHODS FOR MULTIMEDIA GAMES

(71) Applicants: Jan Stelovsky, Honolulu, HI (US); Umida Stelovska, Honolulu, HI (US)

(72) Inventors: Jan Stelovsky, Honolulu, HI (US); Umida Stelovska, Honolulu, HI (US)

( * ) Notice: Subject to any disclaimer, the term of this patent is extended or adjusted under 35 U.S.C. 154(b) by 302 days.

(21) Appl. No.: 14/385,690

(22) PCT Filed: Mar. 19, 2013

(86) PCT No.: PCT/US2013/033010
§ 371 (c)(1),
(2) Date: Sep. 16, 2014

(87) PCT Pub. No.: WO2013/142518
PCT Pub. Date: Sep. 26, 2013

(65) Prior Publication Data
US 2015/0050998 A1    Feb. 19, 2015

Related U.S. Application Data

(60) Provisional application No. 61/612,806, filed on Mar. 19, 2012.

(51) Int. Cl.
| | |
|---|---|
| A63F 13/79 | (2014.01) |
| A63F 13/71 | (2014.01) |
| A63F 13/95 | (2014.01) |
| A63F 13/60 | (2014.01) |

(52) U.S. Cl.
CPC .............. *A63F 13/79* (2014.09); *A63F 13/60* (2014.09); *A63F 13/71* (2014.09); *A63F 13/95* (2014.09); *A63F 2300/6009* (2013.01)

(58) Field of Classification Search
CPC .. A63F 13/60; A63F 2300/6009; A63F 13/71; A63F 13/79; A63F 13/95; H04N 21/80; H04N 21/85; H04N 21/854–21/8586
See application file for complete search history.

(56) References Cited

U.S. PATENT DOCUMENTS

| | | | |
|---|---|---|---|
| 5,613,909 | A | 3/1997 | Stelovsky |
| 5,782,692 | A | 7/1998 | Stelovsky |

(Continued)

FOREIGN PATENT DOCUMENTS

| | | |
|---|---|---|
| KR | 10-2004-0094254 | 11/2004 |
| KR | 10-2008-0005706 | 1/2008 |
| KR | 10-2010-0074968 | 7/2010 |

(Continued)

OTHER PUBLICATIONS

International Preliminary Report on Patentability for International Application No. PCT/US2013/033010 dated Sep. 23, 2014.

(Continued)

*Primary Examiner* — Werner Garner
(74) *Attorney, Agent, or Firm* — Knobbe Martens Olson & Bear LLP

(57) ABSTRACT

Systems and methods for time-segmented multimedia game playing and authoring to create promotional videos and games, for creating games that provide brand advertising, and for gathering player data and analytics are described.

20 Claims, 7 Drawing Sheets

(56) References Cited

U.S. PATENT DOCUMENTS

2011/0306030 A1* 12/2011 Scholler .................. G09B 5/06
434/362
2012/0275761 A1* 11/2012 Li ........................... H04N 9/80
386/239

FOREIGN PATENT DOCUMENTS

KR   10-2010-0133755   12/2010
WO   WO 2008/136630   11/2008

OTHER PUBLICATIONS

International Search Report for International Application No. PCT/US2013/033010 dated Jul. 25, 2013.

* cited by examiner

US 9,861,895 B2

APPARATUS AND METHODS FOR MULTIMEDIA GAMES

CROSS REFERENCE TO RELATED APPLICATIONS

This application is a U.S. National Phase Application of PCT International Application Number PCT/US2013/033010, filed on Mar. 19, 2013, designating the United States of America and published in the English language, which is an International Application of and claims the benefit of priority to U.S. Provisional Application No. 61/612,806, filed on Mar. 19, 2012. The disclosures of the above-referenced applications are hereby expressly incorporated by reference in their entireties. Any and all priority claims identified in the Application Data Sheet, or any correction thereto, are hereby incorporated by reference under 37 C.F.R. §1.57.

BACKGROUND

Field

The present application relates generally to multimedia games, and more specifically to systems, methods, and devices for creating, receiving, and processing information associated with multimedia games.

Background

Movies, music videos and karaoke systems are some of the most successful forms of modern entertainment. Movies and music videos are essentially pre-recorded multimedia presentations with several synchronized tracks. A track is a recorded sequence of specific media type, such as motion video, audio, and text (e.g., of text tracks include movie subtitles and closed captioning).

Karaoke systems are also multimedia presentations with prerecorded video and music audio tracks synchronized with a text display of lyrics, allowing the user to create a new vocal track in real time by singing into the microphone.

Video and electronic games are another popular entertainment form which uses video images, sound, and sometimes text to challenge a player to successfully execute a winning sequence of actions within a given time. Most video games impose time limits on the user's input. Often, the sequencing of video scenes is determined by the player's input. Some computerized games have been tied to real time constraints, such as for playing simultaneously with real-time events.

Other types of computerized games used for educational purposes include narrative or task sequences based on multiple choice, composition, fill-in-the-blanks or other related tasks. There are also instructional games based on motion video presentation which are accompanied by a text track, such as family of products from HyperGlot™ or subtitled films used for language instruction.

However, as the quantity of available multimedia continues to increase, the platforms on which the multimedia is made available, and as the processing power of these platforms improves, certain improvements to time-segmented multimedia game playing and authoring systems are desirable.

SUMMARY

The systems, methods, and devices of the technology each have several aspects, no single one of which is solely responsible for its desirable attributes. Without limiting the scope of this technology, some features will now be discussed briefly. After considering this discussion, and particularly after reading the section entitled "Detailed Description" one will understand how the features of this technology provide advantages that include multicasting through the use of access identifiers.

In one innovative aspect, a device for generating a multimedia game is provided. The device includes a receiver configured to receive an identifier for multimedia content for the multimedia game. The device includes a segment selector configured to receive information identifying a portion of the multimedia content. The device further includes a tasking circuit configured to associate a task with an identified portion of the multimedia content. The device also includes a memory configured to store the identifier, the identified portion of the multimedia content, and the task for the multimedia game.

In some implementations, the identifier for multimedia content includes a uniform resource locator identifying the location of the multimedia content. The device may include a processor configured to obtain one or more of a location of the multimedia content, an identified portion of the multimedia content, and a task for a portion of the multimedia content from the memory. Identifying the portion of the multimedia content can include identifying an area of an image included in the multimedia content. Identifying the portion of the multimedia content can alternative or additionally include identifying a start time and an end time for the portion. The task may include an activity to be performed during the associated identified portion. For example, the task can include one or more of a multiple choice question, a fill-in-the-blank question, an audio response activity, identification of an element included in the multimedia content, a connect-the-dot problem, a video response activity, a gesture response, a subsequent task for presentation upon completion of the task, and a pre-requisite task for presentation prior to the task.

The device may also include a segment extractor configured to automatically identify portions of the multimedia content based on a characteristic of the multimedia content. Identifying portions of the multimedia content may include comparing a characteristic of a first frame of multimedia content with a second frame of multimedia content. For example, the characteristic may include at least one of color level, color location, audio waveform, and audio volume.

The device, in some implementations, may further include a captioning circuit configured to associate a caption with an identified portion of the multimedia content. The caption can include a textual message. The caption may alternatively or additionally include a location within the multimedia content for presenting the textual message.

In a further innovative aspect, a computer-implemented method of generating a multimedia game is provided. The method includes receiving an identifier for multimedia content for the multimedia game. The method includes receiving information identifying a portion of the multimedia content. The method includes associating a task with an identified portion of the multimedia content. The method includes storing the identifier, the identified portion of the multimedia content, and the task for the multimedia game.

In some implementations of the method of generating a multimedia game, the identifier for multimedia content includes a uniform resource locator identifying the location of the multimedia content. The method may further include obtaining one or more of a location of the multimedia content, an identified portion of the multimedia content, and a task for a portion of the multimedia content from a memory. Identifying the portion of the multimedia content may include identifying an area of an image included in the multimedia content. In some implementations, identifying the portion of the multimedia content includes identifying a start time and an end time for the portion. The task can include an activity to be performed during the associated identified portion. For instance, the task can include one or more of a multiple choice question, a fill-in-the-blank question, an audio response activity, identification of an element included in the multimedia content, a connect-the-dot problem, a video response activity, a gesture response, a subsequent task for presentation upon completion of the task, and a pre-requisite task for presentation prior to the task.

In some implementations, the method includes automatically identifying portions of the multimedia content based on a characteristic of the multimedia content. Identifying portions of the multimedia content may include comparing a characteristic of a first frame of multimedia content with a second frame of multimedia content. The characteristic includes at least one of color level, color location, audio waveform, and audio volume. The method may also include associating a caption with an identified portion of the multimedia content. The caption can include a textual message. The caption can include a location within the multimedia content for presenting the textual message.

A non-transitory computer readable medium including instructions executable by a processor a device is provided in a further innovative aspect. The instructions cause the device to receive an identifier for multimedia content for a multimedia game. The instructions also cause the device to receive information identifying a portion of the multimedia content. The instructions also cause the device to associate a task with an identified portion of the multimedia content. The instructions also cause the device to store the identifier, the identified portion of the multimedia content, and the task for the multimedia game.

In another innovative aspect, a device for publishing a multimedia game is provided. The device includes a receiver configured to receive the multimedia game for publication on a target platform, the multimedia game including multimedia content and a task associated with an identified portion of the multimedia content, wherein the task includes information identifying a task response receiver. The device further includes a transmitter configured to publish the multimedia game to the target platform.

In some implementations, the device includes a processor configured to generate a version of the multimedia game based on the target platform. The transmitter may be configured to publish the version of the multimedia game to the target platform. Generating the version of the multimedia game may include one or more of converting the multimedia game from a first format to a second format, adjusting a video quality of the multimedia game, adjusting an audio quality of the multimedia game, or compiling the multimedia game into an executable form. The target platform can include at least one of a network location or a recording device. For example, the network location may include one or more of a file-transfer protocol location, a website, a mobile phone, a set-top box, and a gaming console. The recording device can include one or more of memory, a disc creator, and a disc replicator.

In some implementations, the multimedia game is associated with publication information. The publication information can include one or more of a login for accessing the target platform, a password for accessing the target platform, an address of the target platform, and a channel of the target platform. In some implementations, the transmitter is further configured to publish the version of the multimedia game based on the publication information. The processor may be configured to generate the version of the multimedia game based on the publication information.

The device may further include a digital rights manager configured to generate digital rights information for the multimedia game. The processor may be configured to include the digital rights information in the version of the multimedia game.

In some implementations, the receiver is configured to receive a game play request including an identifier for the multimedia game and digital rights information. The processor may be configured to compare the received digital rights information with the digital rights information generated for the multimedia game associated with the received identifier. The transmitter may be further configured to transmit a game play response indicating whether a play of the requested multimedia game is permitted based on the comparison. In some implementations, at least one of the generating and the transmitting are performed automatically.

A computer-implemented method of publishing a multimedia game is provided in a further innovative aspect. The method includes receiving the multimedia game for publication on a target platform, the multimedia game including multimedia content and a task associated with an identified portion of the multimedia content, wherein the task includes information identifying a task response receiver. The method further includes transmitting the version of the multimedia game to the target platform.

In some implementations, the version of the multimedia game is generated based on the target platform. Generating the version of the multimedia game can include one or more of converting the multimedia game from a first format to a second format, adjusting a video quality of the multimedia game, adjusting an audio quality of the multimedia game, or compiling the multimedia game into an executable form. The target platform can include at least one of a network location or a recording device. For example, the network location may include one or more of a file-transfer protocol location, a website, a mobile phone, a set-top box, and a gaming console. The recording device can include one or more of memory, a disc creator, and a disc replicator.

In some implementations, the multimedia game is associated with publication information. The publication information can include one or more of a login for accessing the target platform, a password for accessing the target platform, an address of the target platform, and a channel of the target platform. In some implementations of the method, transmitting the version of the multimedia game is based at least in part on the publication information. The version of the multimedia game may be generated based on the publication information.

In some implementations, the method includes generating digital rights information for the multimedia game. The method may also include the digital rights information in the version of the multimedia game.

In some implementations, receiving the multimedia game includes receiving a game play request including an identifier for the multimedia game and digital rights information. The method may include comparing the received digital rights information with the digital rights information generated for the multimedia game associated with the received identifier. The method may further include transmitting a game play response indicating whether a play of the requested multimedia game is permitted based on the comparison. At least one of the generating and the transmitting may be performed automatically.

In yet another innovative aspect, a non-transitory computer readable medium including instructions executable by a processor a device are provided. The instructions cause the device to receive a multimedia game for publication on a target platform, the multimedia game including multimedia content and a task associated with an identified portion of the multimedia content, wherein the task includes information identifying a task response receiver. The instructions further cause the device to transmit the version of the multimedia game to the target platform.

A device for monitoring concurrent multimedia gaming is provided in a further innovative aspect. The device includes a receiver configured to receive a plurality of gaming messages for a plurality of multimedia games being played by a plurality of players, each multimedia game including multimedia content and a task associated with an identified portion of the multimedia content, wherein each gaming message includes a timestamp and information about a gaming session. The device includes a processor configured to automatically identify one or more of a player, a game status, and a platform status for each gaming message. The device further includes a memory configured to store the identified one or more of a player, a game status, and a platform status for each gaming message.

In some implementations, the gaming session may be associated with a plurality of multimedia games. The information about the gaming session can include one or more of player information, multimedia game information, platform information, and location information.

In some implementations, the processor is further configured to generate a metric for a multimedia game of the plurality of multimedia games based on one or more of the timestamp and the stored identified one or more of a player, a game status, a task response for a task included in the associated multimedia game, and a platform status for each gaming message. The processor may be configured to generate a metric for a identified player based on one or more of the timestamp and the stored identified one or more of a player, a game status, a task response for a task included in the associated multimedia game, and a platform status for each gaming message.

The processor, in certain implementations, may be configured to automatically identify another multimedia game for a player associated with a gaming message based on the generated metric for the gaming message. The processor may be further configured to transmit an identifier of the other multimedia game, the identifier including information to initiate play of the other multimedia game. A gaming session associated with a gaming message may be ended by the processor based on the generated metric. Ending a gaming session may include preventing play of subsequent multimedia games from the identified player, platform, or location. Alternatively or additionally, ending a gaming session may include preventing subsequent play of the multimedia game associated with the gaming message.

In some implementations, the processor is further configured to identify another multimedia game of the plurality of multimedia games based on the identified one or more of a player, a game status, and a platform status for each gaming message. The device may include a transmitter configured to transmit a message including an identifier for the other multimedia game.

The processor may be further configured to automatically generate a metric for each multimedia game based on the identified one or more of a player, a game status, and a platform status for each gaming message. The processor may also be configured to automatically generate a metric for each player based on the identified one or more of a player, a game status, and a platform status for each gaming message.

A computer-implemented method of monitoring concurrent multimedia gaming is provided in a further innovative aspect. The method includes receiving a plurality of gaming messages for a plurality of multimedia games being played by a plurality of players, each multimedia game including multimedia content and a task associated with an identified portion of the multimedia content, wherein each gaming message includes a timestamp and information about a gaming session. The method includes automatically identifying one or more of a player, a game status, and a platform status for each gaming message. The method further includes storing the identified one or more of a player, a game status, and a platform status for each gaming message.

In some implementations of the method, the gaming session is associated with a plurality of multimedia games. The information about the gaming session can include one or more of player information, multimedia game information, platform information, and location information.

The method may also include generating a metric for a multimedia game of the plurality of multimedia games based on one or more of the timestamp and the stored identified one or more of a player, a game status, a task response for a task included in the associated multimedia game, and a platform status for each gaming message. The method may further include generating a metric for a identified player based on one or more of the timestamp and the stored identified one or more of a player, a game status, a task response for a task included in the associated multimedia game, and a platform status for each gaming message.

The method may include automatically identifying another multimedia game for a player associated with a gaming message based on the generated metric for the gaming message. The method may also include transmitting an identifier of the another multimedia game, the identifier including information to initiate play of the another multimedia game. Based on the generated metric, a gaming session associated with a gaming message may be ended. Ending a gaming session may include preventing play of subsequent multimedia games from the identified player, platform, or location. Ending a gaming session may additionally or alternatively include preventing subsequent play of the multimedia game associated with the gaming message.

In some implementations, the method includes identifying another multimedia game of the plurality of multimedia games based on the identified one or more of a player, a game status, and a platform status for each gaming message. The method may further include transmitting a message including an identifier for the other multimedia game.

The method may include automatically generating a metric for each multimedia game based on the identified one or more of a player, a game status, and a platform status for each gaming message. The method may include automatically generating a metric for one or more players based on the identified one or more of a player, a game status, and a platform status for each gaming message.

A non-transitory computer readable medium including instructions executable by a processor a device. The instructions cause the device to receive a plurality of gaming messages for a plurality of multimedia games being played by a plurality of players, each multimedia game including multimedia content and a task associated with an identified portion of the multimedia content, wherein each gaming message includes a timestamp and information about a gaming session. The instructions further cause the device to automatically identify one or more of a player, a game status, and a platform status for each gaming message. The instructions also cause the device to store the identified one or more of a player, a game status, and a platform status for each gaming message.

In a further innovative aspect, a multimedia gaming system is provided. The system includes the device for generating a multimedia game as described above. The system further includes the device for publishing the multimedia game as described above. The device for publishing the multimedia game being coupled with the device for generating a multimedia game.

In some implementations, the system may include the device for monitoring concurrent multimedia gaming as described above. The plurality of multimedia games monitored by the device for monitoring concurrent multimedia gaming may include the multimedia game published by the device for publishing.

In a further innovative aspect, another multimedia gaming system is provided. The system includes the device for generating a multimedia game as described above. The system further includes the device for monitoring concurrent multimedia gaming as described above. The plurality of multimedia games monitored by the device for monitoring concurrent multimedia gaming includes the multimedia game generated by the device for generating. In some implementations, the system includes the device for publishing the multimedia game as described above coupled with the device for generating a multimedia game.

A further innovative multimedia gaming system is provided. The system includes the device for publishing a multimedia game as described above. The system also includes the device for monitoring concurrent multimedia gaming as described above. The plurality of multimedia games monitored by the device for monitoring concurrent multimedia gaming includes the multimedia game published by the device for publishing. The system may include the device for generating a multimedia game as described above, the device for generating coupled with the device for publishing.

DETAILED DESCRIPTION

Figure 1:
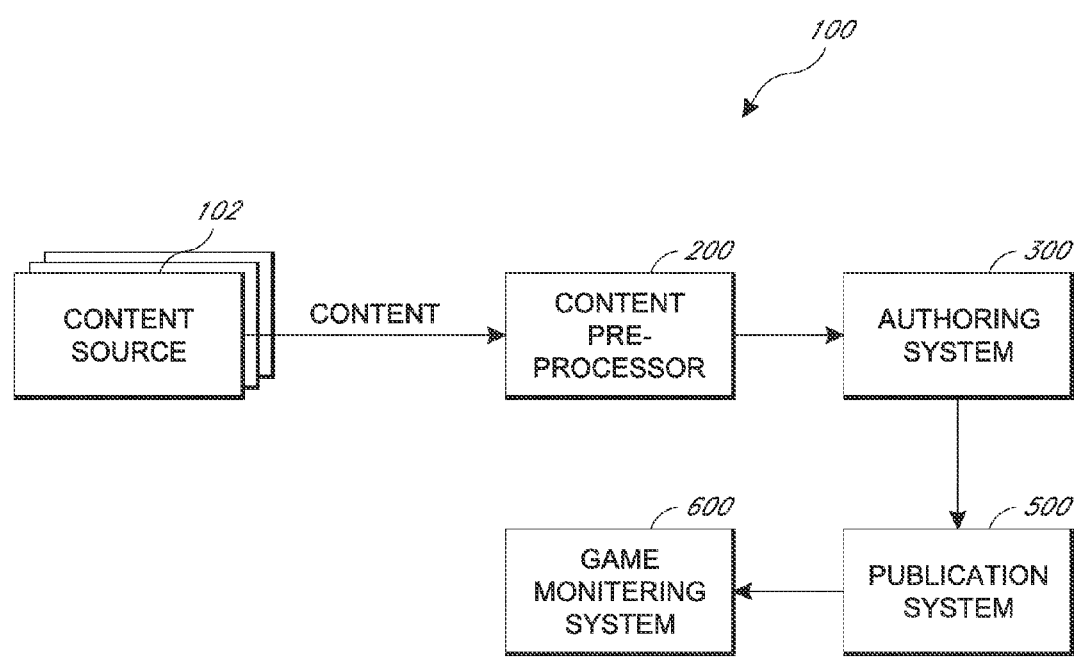
FIG. 1 illustrates an example of a multimedia gaming system.

Generally described herein are systems and methods to seamlessly integrate, wed or integrate video games with video programming, including linear video programming, for example. Through aspects discussed below, virtually any video or video segment can become host to or integrated with a game—such as for entertainment, for education, and for marketing. The systems and methods for authoring, publishing, and analyzing multimedia games can provide valuable opportunities to rapidly and effectively create engaging multimedia based games, distribute the games across a variety of platforms and devices, and collect a trove of information about who are the players, what the players know, what the players learn, and how their knowledge changes over time.

Games can generally be defined as a computer-mediated personal or group interactive experience. The intended uses may include, but are not limited to, entertainment, education, training, skill assessment and/or certification, social interactions, marketing research, and other applications based at least in part on data analytics.

Various aspects of the novel systems, apparatuses, and methods are described more fully hereinafter with reference to the accompanying drawings. The aspects of this disclosure may, however, be embodied in many different forms and should not be construed as limited to any specific structure or function presented throughout this disclosure. Rather, these descriptions are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the technology. For example, an apparatus may be implemented or a method may be practiced using any number of the aspects set forth herein. In addition, the scope of the technology is intended to cover such an apparatus or method which is practiced using other structure, functionality, or structure and functionality in addition to or other than the various aspects of the technology set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks, devices, applications, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Methods and systems for authoring and playing games including time segments have been described. Two examples may be found in U.S. Pat. No. 5,782,692 entitled "Time-Segmented Multimedia Game Playing and Authoring System" and U.S. Pat. No. 5,613,909 entitled "Time-Segmented Multimedia Game Playing and Authoring System," which are commonly owned and each hereby expressly incorporated by reference in their entirety.

As will be described below, systems, methods, and devices for creating, receiving, and processing information associated with multimedia games are provided. One non-limiting advantage of the presently described system and methods is the use of previously generated content. As an example, the Internet has provided a seemingly limitless platform for ideas and expression. Each day, an expansive quantity of bytes of content are posted for public consumption. In many cases, the content may be used by third-parties. Some forms of this re-use are called "mash-ups" whereby one or more source of content is combined to create a new offering. The content may be video, video with audio, enhanced video (e.g., video with subtitles or other embedded data), three dimensional video, audio only, enhanced audio (e.g., audio with time synchronized text (e.g., lyrics) or time synchronized images) as just a few examples.

The reused content may be personal videos (e.g., home movies posted via a personal site, or file sharing site). The reused content can be a recording of a sequence of images underlined by music or commentary. The reused content may be commercially produced videos such as a traditional television advertisement or program. The reused content may be a previously recorded training video. The reused content can be a recorded lecture. By providing a platform which allows new multimedia games to be generated using existing content, the cost and speed with which the new games may be generated can be improved. Furthermore, the content need not necessarily be stored. As will be discussed below, the content may be a live content stream. Using the techniques described, a live stream, such as a television broadcast of a sporting event, may be segmented and associated with game tasks or captions.

Another non-limiting benefit of the techniques described is related to the game authoring component. Authoring a time-segmented multimedia game includes defining the time-segments of the content. As will be described below, various characteristics of the content may be used to identify a suggested segmentation for the content. The suggested segments may be used to expedite the authoring process. Furthermore, the characteristics of the content may be further analyzed to provide recognition of objects within the content. For example, in a piece of video content, if an actor enters the scene carrying a cup of coffee, the cup of coffee may be identified and tracked through the scene. Similarly, the actor himself can be tracked through the scene. As will be described, this object may be referenced as part of the multimedia game.

A further non-limiting benefit to the techniques described herein includes a more robust set of tasks or captions which can be associated with a time-segment. Improving the quantity of task types that may be associated with a time-segment, as well as providing an efficient authoring system to allow multiple, diverse tasks to be associated with a time-segment are described. This provides more variety for the games. This also provides a richer experience beyond simply selecting from a set of choices.

Tasks may or may not have a unique solution. In some cases, a task may not have a solution at all. An example of a task without a defined solution is a question on an opinion pool. Such tasks may be interspersed among solution-oriented tasks to conduct opinion pools and/or product reviews within more engaging game portions.

Besides tasks, a game's segment can be associated with informational messages (e.g., caption) that will be displayed instead of a task. Unlike a task that allows the user to interact with it, such a caption is displayed during the associated segment time span. Such captions can for instance display some promotional message, or the description of the upcoming task (e.g., a quiz question, statistics about how many other players solved a task (e.g., next task, previous task) correctly), how many more points the player needs to reach a particular reward (e.g., badge, coupon)).

Yet another non-limiting benefit of the techniques described herein relates to the organization of authors of the multimedia games. By providing a multimedia authoring platform that allows team authoring, the process of creating a game can be divided among multiple authors. Furthermore, the team may be recognized as a collective thus helping to spur competition between teams. When coupled with the publication aspects described, a flexible model to create and publish games is provided. For example, a large corporation may wish to devote a department to the authoring of games or to host the games on a dedicated server while a smaller company may prefer to outsource the publication.

Another non-limiting benefit of the systems and methods described is the ability to publish to multiple platforms. A platform generally refers to the device or environment in which the multimedia game will be played. Devices capable of playing games are simultaneously converging in functionality and proliferating in their presence. Phones, televisions, set-top boxes, watches, cars, desktop computers, laptop computers, tablet computers, kiosks, game consoles, DVD players, Blu-Ray players, audio receivers, and the like have the ability to play games. Platforms can include unrelated gadgets such as movie theater screens showing previews of trailers, TV screens showing advertising in stores, on billboards at sports stadiums, or in front of Las Vegas casinos displaying multimedia content in conjunction with phones, microphones, dance pads, steering wheels, or other physical devices as means that allow the to players to interact with the system to respond to game tasks. Each may serve as a platform for playing the multimedia games described herein.

A further non-limiting beneficial aspect of the present systems and methods described is the ability to receive information about the multimedia game. For example, capturing which users are playing a particular game can provide information such as the popularity of a game. Over time, as users play the same game, how the user's understanding of the subject matter included in the game can also be tracked. For example, in an educational multimedia game, a student's ability to correctly multiply may be tracked by noting the number of questions correctly answered. Furthermore, the speed with which an answer is provided may also provide valuable insight into the users learning and retention process.

Through the use of multimedia games, viewers and players are engaged in an interactive method with the content. The players can learn about the subject of the content through the content itself as well as through tasks associated with viewing the content. Furthermore, players may be rewarded for playing a game with points or other incentives. The incentives may change based on factors such as time, the number of players, the number of times a player has played the game. In addition, the authors and sponsors of the games can identify which games are reaching the target audience, and which are not achieving their intended result.

FIG. 1 illustrates an example of a multimedia gaming system. The multimedia gaming system 100 described can enable the creation, publication, and analysis of multimedia games. The multimedia gaming system 100 can obtain the multimedia content upon which a game will be constructed from one or more content sources 102. The content sources 102 may be included in the multimedia gaming system 100. For example, content sources 102 may include a video recorder or a storage device (e.g., disk drive, USB drive, flash drive, CD-ROM, DVD-ROM, Internet site, and the like). The content source 102 may be accessible from the multimedia gaming system 100. For example, a web site may host the multimedia content which can be accessed through a network interface.

The multimedia gaming system 100 may be configured to receive many different types of content. Audio content may be used to create games. Enhanced audio content, such as audio content including metadata (e.g., MP3 tags), lyrics, surround sound channels, or other information, may be used to create games. Video content may be used to create games. Enhanced video content, such as video content including one or more extra layers of information (e.g., metadata, subtitles, alternative angles, alternate audio tracks), may be used to create games. Video may be two-dimensional or three-dimensional video.

Content engaging other senses may be included. For example, a video component may be joined with a "scent track" which includes signals that may be used by a mister or other scent producing device to provide a certain smell at points during the video such as a smell of ingredients and/or spices released during a cooking show. For such content, a task asking a player to guess their provenience may be included.

Content engaging the sense of touch may be included. For example, a video component may be joined with a "haptic track" which includes signals that may be used to adjust a haptic suit. A haptic suit may include one or more attachments worn on a body, such as incorporated in a dress, which may be configured to cause heating and/or cooling sensations, pressure, vibration, etc. A pressure game may include pressing acupuncture points and asking which organs they affect.

Content engaging the sense of taste may also be included. For example, the video component may feature landscapes of wine regions around the world. The system may include a tube that releases drops of wine varieties for the player to taste. A player may be asked to guess whether they match or choosing from images symbolizing the nose. This system may be used, for example, at culinary trade shows or wineries to promote taste oriented products.

The content may be received by the multimedia gaming system 100 and stored in a memory. The memory, which may include both read-only memory (ROM) and random access memory (RAM), may be configured to provide instructions and data to the multimedia game system 100. For example, the operating system instructions may be stored in a portion of the memory. A portion of the memory may also include non-volatile random access memory (NVRAM). The instructions in the memory may be executable by a processor to implement the methods described herein.

The multimedia gaming system 100 may also include a content preprocessor 200. The content preprocessor 200 may be configured to obtain the content, such as from the memory, and perform initial processing on the content prior to authoring. The content preprocessor 200 will be described in further detail with reference to FIG. 2.

The multimedia gaming system 100 may include an authoring system 300. The authoring system 300 may receive signals to identify multimedia segments, such as for example, time-segments as well as to associate tasks with time-segments. The authoring system 300 will be described in further detail with reference to FIG. 3.

The multimedia gaming system 100 may include a publication system 500. The publication system 500 can prepare and publish authored multimedia games. The publication system 500 will be described in further detail with reference to FIG. 5.

The multimedia gaming system 100 may include a game monitoring system 600. The game monitoring system 600 can monitor aspects of published games. For example, the game monitoring system 600 may identify which games users are playing, how users are (or are not) learning from the game, and how the users knowledge is changing over multiple game sessions. The game monitoring system 600 will be described in further detail below with reference to FIG. 6.

Although a number of separate components are illustrated in FIG. 1, those of skill in the art will recognize that one or more of the components may be combined or commonly implemented. For example, the content preprocessor 200 may be combined with the authoring system 300. Further, each of the components illustrated in FIG. 1 may be implemented using a plurality of separate elements. In some implementations, one or more of the components of FIG. 1 may be specifically excluded.

The multimedia gaming system 100, or any element included therein, may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
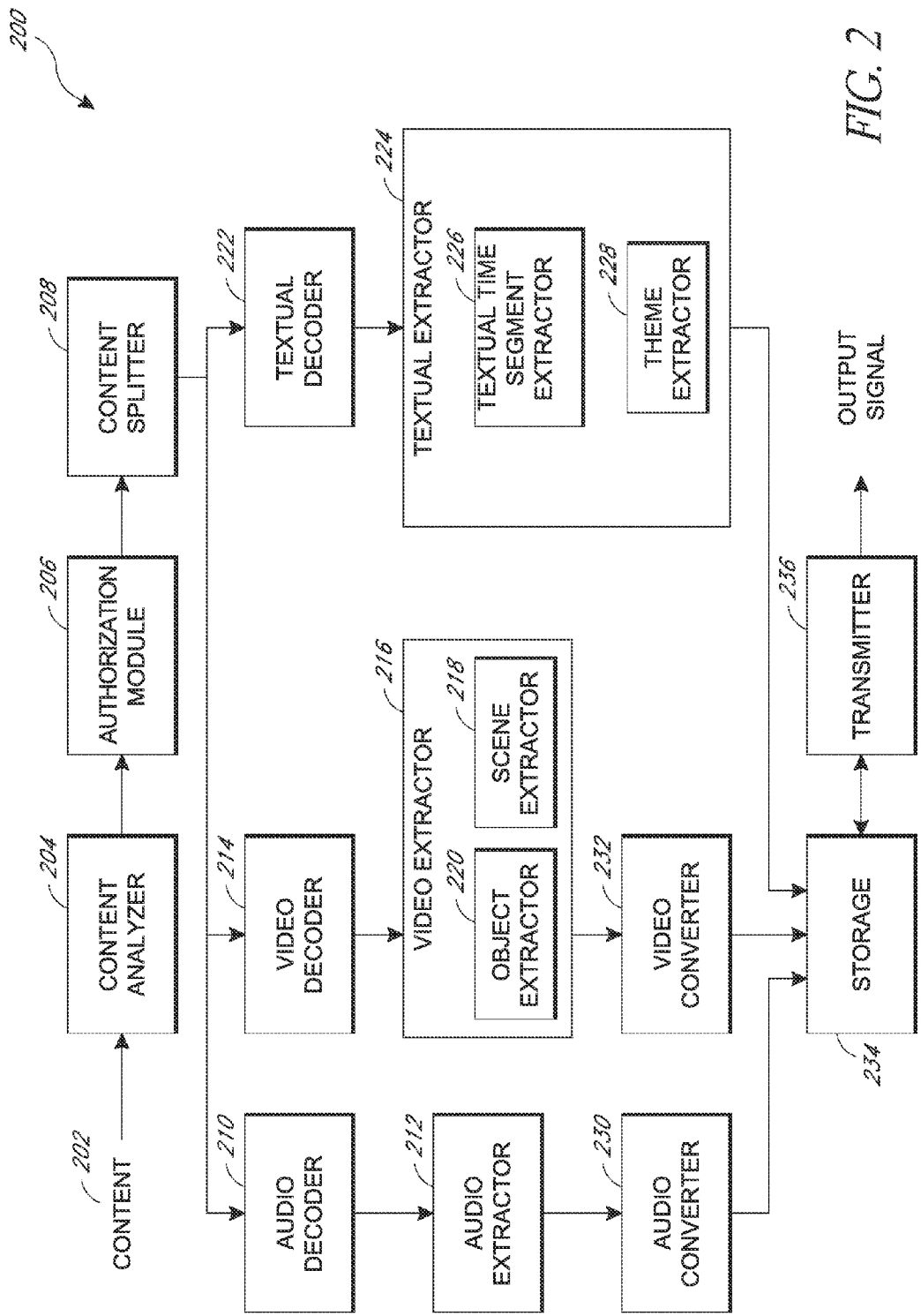
FIG. 2 illustrates a functional block diagram of an example of a content preprocessor.

FIG. 2 illustrates a functional block diagram of an example of a content preprocessor. The content preprocessor 200 can accept a piece of content 202. The content 202 may be provided to the system by an author via an interface. The content 202 may be loaded into the multimedia gaming system 100 through an automated process (e.g., batch, FTP). The content 202 may be a stream of live content. The content 202 may first be analyzed by a content analyzer 204 to determine what kind of content is being processed. As discussed above, the types of content which the multimedia gaming system 100 can handle are diverse. Accordingly, the appropriate processing steps should be selected for the content 202. For example, if the content 202 does not include a video component, no video processing steps necessarily need to be performed.

Having identified the type of content, the content 202 may be processed by an authorization module 206. The authorization module 206 may obtain an indication of the type for the content 202 to be authorized. For example, the content analyzer 204 may store an indicator of the type for the content 202. In some implementations, the content analyzer 204 may transmit the indicator directly to the authorization module 206.

The authorization module 206 may be configured to authorize the content for game creation. The method of authorization used by the authorization module 206 may be based at least in part on the obtained content type. In some implementations, it may be desirable to prevent protected works from being turned into games without the owner's permission. As an example, the authorization module 206 may use digital copyright markings for identifying a protected work. In some implementations, it may be desirable to prevent certain types of content from being made into a game. For example, the authorization module 206 may be configured to detect adult oriented content and prevent a game from being authored with the content. In some implementations, it may be desirable to tag the content as adult rather than preventing authoring.

Once authorized, the content 202 may be split by a content splitter 208, for example, if the content 202 includes both audio and video components. As with the authorization module 206, the operation of the content splitter 208 may be based at least in part on the content type being processed. The content splitter 208 may be configured to obtain an indication of the type for the content 202 as described above.

The content splitter 208 may separate the audio and video components of the content. The content splitter 208 may also identify and separate textual components. As discussed above, some content may include multiple video angles or audio tracks. Each track may be separated and preprocessed accordingly.

As shown in FIG. 2, at least three basic types of content components may be preprocessed, audio, video, images, and textual. If the content 202 includes one or more audio components, the audio components are provided to an audio decoder 210. The audio decoder 210 may be configured to decode the audio component of the content 202. The audio decoder 210 may prepare the audio for extracting. For example, the audio decoder may standardize the representation of the audio information (e.g., enhanced, converted).

The decoded audio information may be saved in a storage 234. In some implementations the decoded audio information may be transmitted directly to an audio extractor 212.

The audio extractor 212 may be configured to obtain an audio component and extract information based on the audio information. For example, the audio extractor 212 may be configured to extract time segments for the audio component. The time segments may be identified based on characteristics of the audio information such as peak analysis, repetition analysis (e.g., identifying the chorus of a song), volume analysis, silence, voice recognition, identification of an instrument, identification of a singer, identification of an actor, and the like.

The time segment information may include, for example, information such as a segment start time, a segment end time, a unique segment identifier, and a content identifier indicating the content 202 serving as the source for the segment. The identified segment information may be provided to the storage 234 and associated with the content 202.

Similarly, if the content includes one or more video components, the video components may be provided to a video decoder 214. The video decoder may be configured to decode the video component of the content 202. The video decoder may prepare the video for extracting. For example, the video decoder may standardize the representation of the video information (e.g., enhanced, converted). Note that the video may consist of a timed sequence of images, such as in a prerecorded slide presentation, in which case the video decoder can be configured to identify the individual images for further processing.

The decoded video information may be saved in the storage 234. In some implementations the decoded video information may be transmitted directly to a video extractor 216.

The video extractor 216 may be configured to obtain a video component of the content 202 and extract information based on the video information. For example, the video extractor 216 may include a scene extractor 218. The scene extractor 218 may be configured to extract time segments for the video component. The time segments may be identified based on characteristics of the video information such as scene change, pixel analysis, frame analysis, and the like.

The time segment information may include information such as a segment start time, a segment end time, a unique segment identifier, and a content identifier indicating the content 202 serving as the source for the segment. The identified segment information may be provided to the storage 234 and associated with the content 202.

The video extractor 216 may include an object extractor 220. The object extractor 220 may be configured to identify and extract one or more objects from the video component of the content based on the video information. For example, if a ball bounces into the scene, the pixel location of the ball may be identified and tracked through the video. By identifying an object in the video, the object may be referred to as part of the multimedia game. For example, in an educational game, the word "ball" may be displayed and the task may be to click on the object corresponding to the word "ball" in the video. The object extractor 220 may be configured to identify people in a scene (e.g., facial recognition).

The object information, for example, may include information such as a time location in the video, a shape for the identified object at the time location, a unique object identifier, any associated time segments, and a content identifier indicating the content 202 serving as the source for the object. It will be appreciated that the shape information may be two-dimensional for two-dimensional videos and three-dimensional for three-dimensional videos. The identified object information may be provided to the storage 234 and associated with the content 202.

Furthermore, if the content includes one or more textual components, the textual components can be provided to a textual decoder 222. In some implementations, the audio decoder 210 may be configured to generate a textual representation of the audio component of the content 202. This textual representation may be provided to the textual decoder 222.

The textual decoder 222 may be configured to decode the textual component of the content 202. The textual decoder 222 may prepare the text for extracting. For example, the textual decoder 222 may standardize the representation of the textual information (e.g., enhanced, converted).

The decoded textual information may be saved in the storage 234. In some implementations the decoded textual information may be transmitted directly to a textual extractor 224.

The textual extractor 224 may include a textual time segment extractor 226. The textual time segment extractor 226 may be configured to obtain a textual component of the content 202 and extract information based on the textual information. For example, the textual extractor 220 may be configured to extract time segments for the textual component based on textual analysis. For example, if the textual information is lyrics to a song, the identification of the chorus by locating repeating phrases may be used to time segment the textual information. The time segment information may include information such as a segment start time, a segment end time, a unique segment identifier, and a content identifier indicating the content 202 serving as the source for the segment. The identified time segment information may be provided to the storage 234 and associated with the content 202.

The textual extractor 220 may include a theme extractor 228. The theme extractor 228 may be configured to extract themes from the textual information. For example, by analyzing the words used in a block of text, words of higher frequency may be used indentify the theme of the text. The theme information may include information such as the word(s), a location (e.g., time) within the component, a unique theme identifier, and a content identifier indicating the content 202 serving as the source for the theme. The identified theme information may be provided to the storage 234 and associated with the content 202.

Though not shown in the example preprocessor 200 in FIG. 2, the video extractor 216 and/or audio extractor 212 can also include associated theme extractors. For instance, a movie scene can be classified according to its mood as sad or happy, according to its background as indoors or outdoors, according to its color characteristics (e.g., bright or saturated colors versus muted), or according to its audio characteristics (e.g., volume, tone, etc.). Similarly, a music performance can be identified as classical concert or a rock concert. The extractor may also include task extractors. For example, if the video theme extractor identified that a scene with a child holding a card with a "3*4" text on it, the task processor can generate the correct choice "12" automatically by detecting a multiplication task and solving it as well as generate the incorrect choices "13" and "8".

The preprocessor 200 may include one or more content type converters. As shown in FIG. 2, an audio converter 230 and a video converter 232 are included. The audio converter 230 may be configured to generate different versions of the audio component. For example, the audio quality for a high-definition multimedia game may be different than the audio quality for a multimedia game to be played over a limited bandwidth network. Accordingly, one or more versions of the audio component may be generated and stored in the storage 234. The audio converter 230 may be configured to convert the audio component is different audio formats (e.g., MP3, MP4, WAV). The audio converter 230 may also perform additional enhancements on the audio component such as noise reduction, hiss removal, amplification, normalization, muting, trimming, resampling, and the like.

Similarly, the video converter 232 may be configured to generate different versions of the video component of the content 202. As with the audio converter 230, the high-definition game needs may be different than a limited bandwidth game. Accordingly, one or more version of the video component may be generated by the video converter 232 and stored in the storage 234. The video converter 232 may be configured to convert the video component to different formats and/or different encodings (e.g., MPEG, MOV, QuickTime, H.264). The video converter 232 may be configured to convert the dimensional format of the video content (e.g., from 2D to 3D, from 3D to 2D). The video converter 232 may also perform additional enhancements such as color adjustments, compression, normalization, sharpening, unsharpening, and the like.

At this point the preprocessor 200 has authorized and analyzed the content 202. In the streaming content scenario, a predefined list of tasks may be provided. For example, a storage may be provided which includes tasks associated with objects and/or themes. The storage may be searchable based on an object or theme. In such an implementation, the extracted segments, objects, and themes may be used to select an appropriate task. For example, if the stream is a live stream of a running event, the preprocessor may identify the start of a segment when the feed shows a close up of a runner. The object extractor 220 may identify the runner such as via facial recognition or a numbered jersey. This information may be used to query a data base of tasks about the identified runner such as hometown, date of birth, favorite book, best time in the last season. The task or caption may be presented for a predetermined minimum time for all tasks or for a time associated with this task or caption. The task may be presented until a new time segment is identified. In some implementations, the live stream may not include any identified themes or objects. In such implementations, a generic task may be selected. For example, if the live stream includes a baseball game which has been stopped due to rain delay, a general baseball task or substitute caption may be presented. Accordingly, tasks may be automatically and dynamically presented with the live streaming content. A transmitter 236 may be included to transmit the enhanced signal which may include the content and the game information, or just the game information.

In some implementations, the time segment, object, and theme information may be stored in the storage 234 and ready for later use such as for use in authoring multimedia games. A signal indicating the completion of the preprocessing may be provided by the preprocessor 200 such as via the transmitter 236. The signal may be used to trigger an event within an authoring tool which can be used to compile the identified information into a multimedia game. In some implementations, one or more of the above-described components, features, device, etc. in connection with FIG. 2 may be specifically excluded. Any combination of the components is contemplated.

In some implementations, several tasks may be associated with a segment allowing the player to solve numerous tasks per segment thus augmenting her score. Moreover numerous tasks or captions can be associated with a segment within the tasks database and then selected randomly during the actual playing session. In this scenario, each task can be associated with a weight according to the probability that it should be selected. In case that the tasks or captions contain promotional material, the weight can correspond to the price charged to the organization or the individual paying for the promotion, such as based on a bidding schema.

Figure 3:
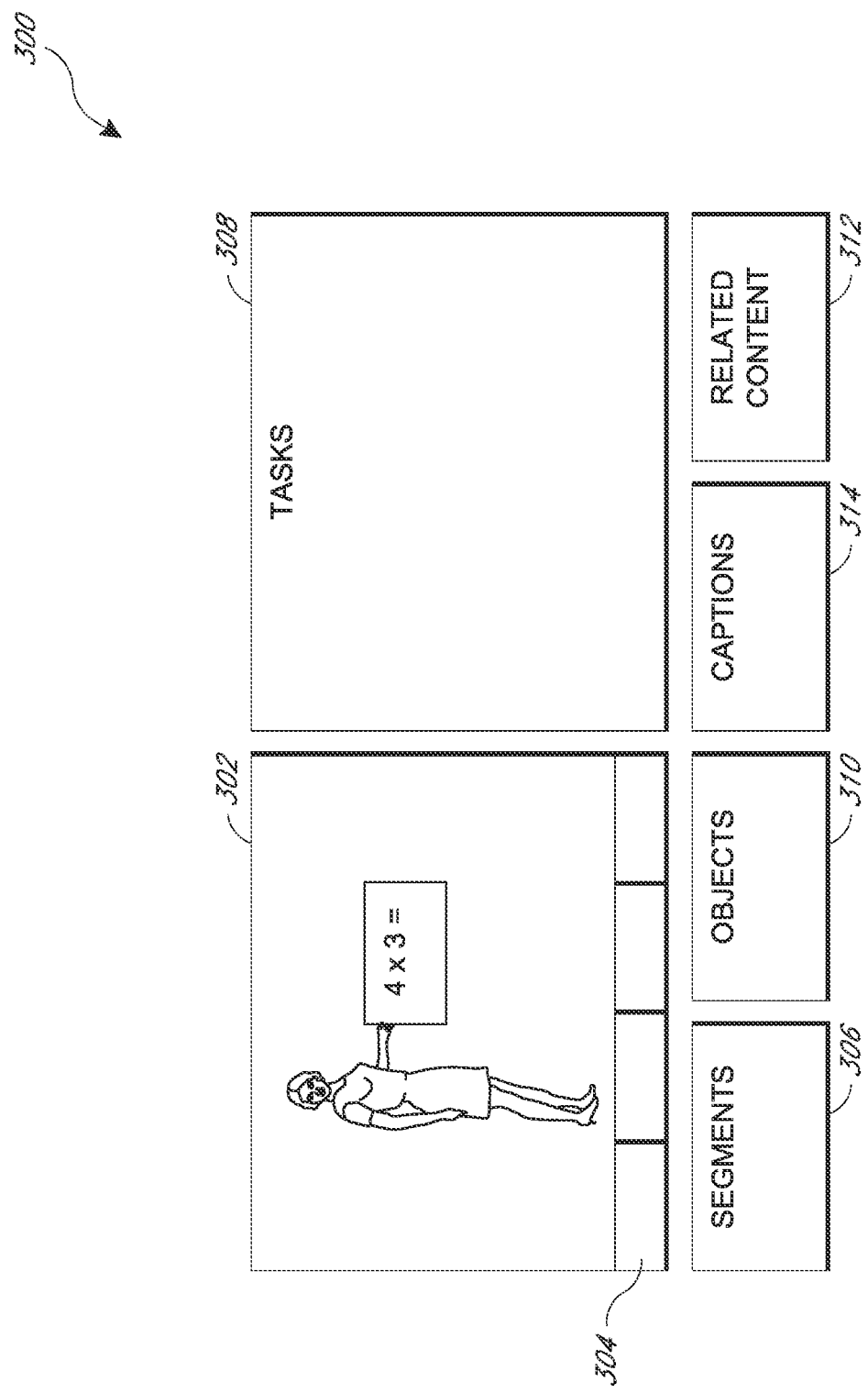
FIG. 3 shows an interface for an example authoring system.

FIG. 3 shows an interface for an example of an authoring system. The authoring system 300 may be initialized by obtaining the signal indicating the completion of the pre-processing. The signal may identify the content 202 for the game to be authored. Using the content identifier, the authoring system 300 may obtain the various time segments, objects, and themes previously identified for the content 202.

The interface may include a content viewer 302. The content viewer 302 may present the content 202. The content viewer 302 may include multiple views to allow the author to display only certain components of the content 202 (e.g., the video component, the audio component, the textual component).

The interface may include a current time segment viewer 304. The current time segment viewer 304 indicates the currently specified time segments for the content 202. The current time segment viewer 304 tracks the segments over time. As such, when the content viewer 302 is activated, an indicator illustrating the playback position relative to a time segment may be displayed. Thus, an author can see the current time segments as the content 202 plays.

The interface may include an extracted time segments panel 306. The extracted time segments panel 306 may be configured to display the time segment information extracted by the preprocessor 200. The extracted time segments panel 306 may present the extracted time segments based on the component from which the time segment was extracted (e.g., audio, video, textual). The extracted time segments panel 306 may present the extracted time segments chronologically. As part of the authoring process, one or more extracted time segments may be identified within the extracted time segments panel 306. The authoring system 300 may receive a signal including this indication and may, in turn, apply the selected time segments as current time segments.

For example, consider content including three scenes. Each scene is a child holding an index card with a multiplication problem written on it. The scenes each last approximately 30 seconds. The preprocessor 200 may identify, for example, three time segments for this content: (a) 0-29 seconds corresponding to the first multiplication problem; (b) 30-59 seconds corresponding to the second multiplication problem; and (c) 60-89 seconds corresponding to the third multiplication problem. These time segments may be identified in the extracted time segments panel 306. The current time segment viewer 304 may then divide into three segments corresponding to the three scenes identified. The author does not necessarily need to enter start and end times to identify the segments or to completely segment the content. This can help expedite the creation of multimedia games.

The interface shown in FIG. 3 may include a task panel 308. The task panel 308 may be configured to present and receive signals associating tasks with the current time segments identified for use in the multimedia game. A task may be one or more activities for the game player to perform during the time segment. Examples of tasks include multiple choice questions, fill-in-the-blank, voice response (e.g., say a particular word or phrase), identification of in-game objects, connect the dots, and video response (e.g., make a particular motion). The tasks may accept input from input devices associated with the game player (e.g., keyboard, camera, microphone, remote control, accelerometer, thermometer, 3D eyewear, 3D helmet, haptic suit).

A task may have a predecessor task. For example, in a training video, a task may require an understanding of a fundamental concept. If the player has not grasped the fundamental concept, the subsequent task may be confusing or unachievable. Accordingly, the predecessor task or tasks may be identified. Conversely, a task may have a subsequent task. Once a player completes a first task, it may be desirable to immediately perform a similar task to help solidify the concept.

A task may include a selection of a subsequent content/game to continue. For example, based on the result of the game, a history of playing games by an individual player, and/or a result of a specific task, control may continue at another time point in the current video or in another video. For example, the authoring system 300 may receive a selection from one or more related videos and associate the continuation time points within the related video. The authoring system 300 may receive signals identifying a strategy (e.g., selection from algorithms) used to choose, based on task responses, historical results, or current game results, which of the continuation paths will be followed. For example, the task panel 308 may include predecessor or successor result event which have one or more conditions. The condition may be based on one or more of the current game, historical game information, current task, platform, location, or other information received by the game monitoring system. The condition may be based on the information for the current player, an aggregation of players sharing similar characteristics as the current player (e.g., location), or an aggregation for all players. As an example, the author may indicate that if a user answers a particular task correctly within 5 seconds the next segment to present should be the time segment for another video beginning at 1:45 of the other video. The related content may be identified using a related content panel 312. The content provided in the related content panel 312 may be identified based on a theme of the current content, objects identified in the current content, common authorship, common team, or the like.

Tasks may also include identifying an object within the game. The interface may include an extracted object panel 310. The extracted object panel 310 may be configured to display the object information extracted by the preprocessor 200. The task panel 308 may be configured to receive an indication of an object from the extracted object panel 310 to use as a response for a task. As discussed above, in some implementations, the tasks may be generated automatically during preprocessing. In some implementations, the generated tasks may include generated responses.

Each response for a task may include one or more result events. For example, a result event may include information to display (e.g., congratulations message, promotional message, additional information), a video playback position to advance to or replay from based on the result, or a scoring adjustment assigned to the result (e.g., points gained, points lost). Other forms of feedback like a sound or color effect may be associated with a response to enhance the result, for instance, an applause sound can accompany a correct solution while a flushing sound can announce an incorrect answer.

At some either predetermined or random time points, the game can display an object either on top of the video or in the game portion of the display, or in the surrounding screen area. Selecting such a "golden egg" object can give the player an extra reward, e.g. extra points, a discount coupon, or chance to double the points in the next segment.

As discussed above, a caption may be associated with a time segment. The authoring system 300 may include a captions panel 314. The captions panel 314 may provide a list of caption content and receive a signal associating the caption content with one or more time segments. For example, a caption may be a textual message commenting on the content. As with tasks, captions may have one or more predecessors and/or successors. Captions may also be conditionally displayed as discussed above.

Accordingly, multiple tasks can be assigned for the content 202 to generate an interactive multimedia game. Each task may have unique responses and unique response events for each possible user input.

In some implementations, the authoring system 300 may receive information associating one or more hints with a particular task. For example, a player may "buy" (e.g., with accrued points) a hint for a task. The hint may have a visual appearance, e.g. a button at the task statement (e.g., the question) or a link that appears either directly, as a part of the statement or when the user points to it with the mouse (or with a gesture, e.g. touches it with her finger). In response, content may be displayed directly at the game-playing page or even lead to another page, such as to another web site. The video may be stopped at this point allowing the player to view to hint content. Once the player restarts the game, the hint content may be hidden for example if the content is displayed directly on the game page. In some implementations, the hint content may be displayed in another tab or window of the browser.

The authoring system 300 may be accessed by an individual user. For example, the authoring system 300 may include a login module to allow an author to identify themselves to the authoring system 300. The authoring system 300 may store one or more multimedia games and the associated author. In this way, one author may start a game, save their work, and return to continue working on the game at a later time. Similarly, multiple authors may be collected into teams. A game identified as a team authored game may be edited by any members of the team. For example, a user can access the authoring system in real time, creating the start and end points of a segment, pointing to an object shown in a video, choosing from a list of possible themes or selecting a subset of appropriate tasks or speaking a task into a microphone. In a multi-author setting several users can contribute to the authoring process in real time.

While the authoring system 300 has been described thus far as authoring for a single multimedia file (e.g., video), the authoring system 300 may be used to compose a presentation based on a variety of media resources such as text, graphical, audio, video, etc. For example, the authoring system 300 may receive the identification of a segment video to use as the introduction to the game. The authoring system 300 may further associate a slide of graphical information (e.g., text with some iconography) with the game after the video segment. In one implementation, this may be a quiz question. As described above, a task such as multiple choice question may be associated with the slide portion of the game. Based on the answer received, the authoring system 300 may receive different content elements to present. For example, if an incorrect answer is provided, remedial content may be presented. If a correct answer is provided, the game may include a reward graphic and/or subsequent content of increased difficulty.

Figure 4:
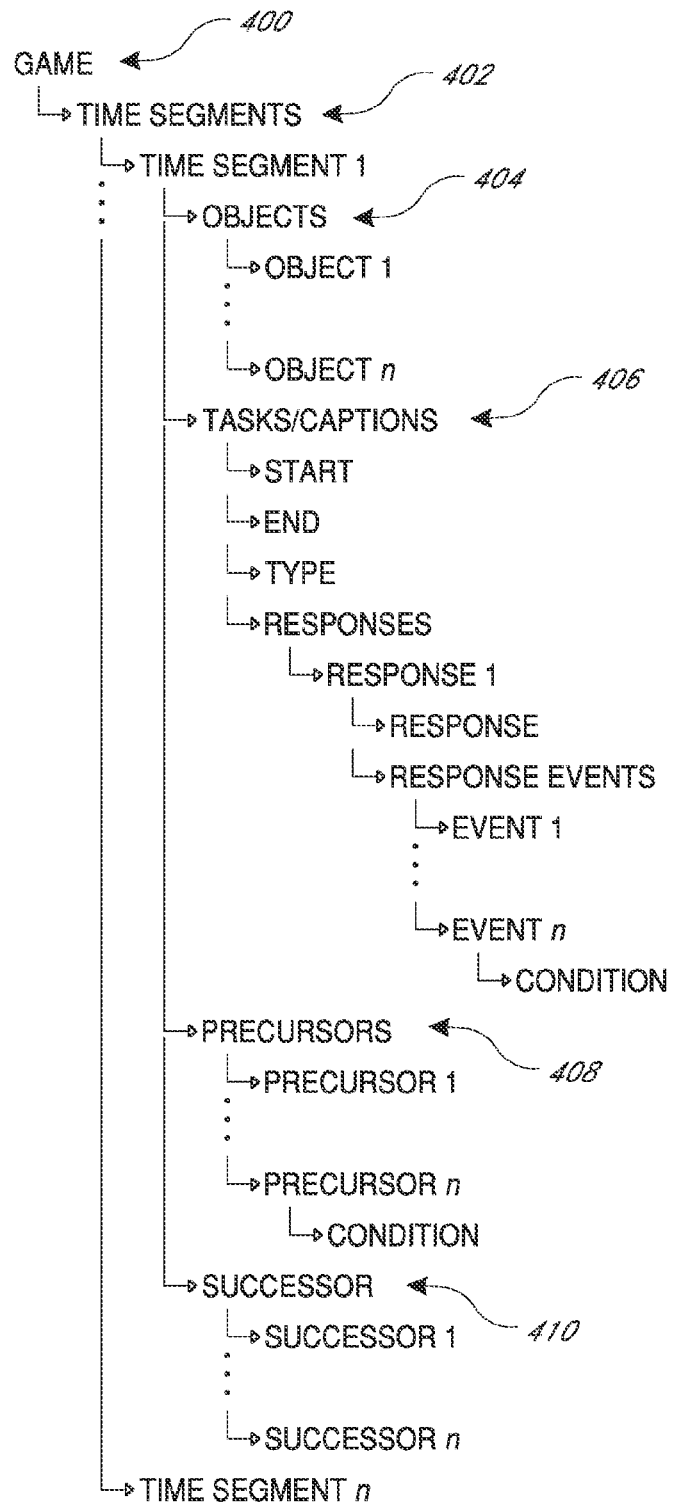
FIG. 4 illustrates a relationship diagram for the various entities included in an example of a time segmented multimedia game.

FIG. 4 illustrates a relationship diagram for the various entities included in a time segmented multimedia game. The relationship diagram represents the relationships for a game 400. The game 400 may include one or more time segments 402. Each time segment may include a start and an end time. Each time segment 402 may also include one or more objects 404. Each time segment may further include one or more tasks/captions 406. Each task/caption 406 may include a start time and an end time. Each task/caption 406 may include a task type. Each task/caption 406 may include one or more responses. Each response may include one or more response events (e.g., go to a certain game, assign certain points). Each event may include a condition. Each task/caption 406 may also include one or more predecessors 408 and/or one or more successors 410. As discussed above, a predecessor or successor may include a condition. A successor can include the identification of a time point within another video where to continue with the multimedia presentation. This time point can be determined based on the correctness of the player's responses and the history of player's performance within the game or across numerous games. The authoring system 300 can include display of and selection from other content together with a visual playback point selector and/or a time code entry field that receive inputs indicating the time point in the content to continue.

The relationship diagram in FIG. 4 is merely one example of how the entities for a multimedia game may be represented. It will be understood that other relationships may be used to structure the game information.

With the game authored, either by an individual or by a team, the game is ready to be played. Providing the game may generally be referred to as publishing the game.

Figure 5:
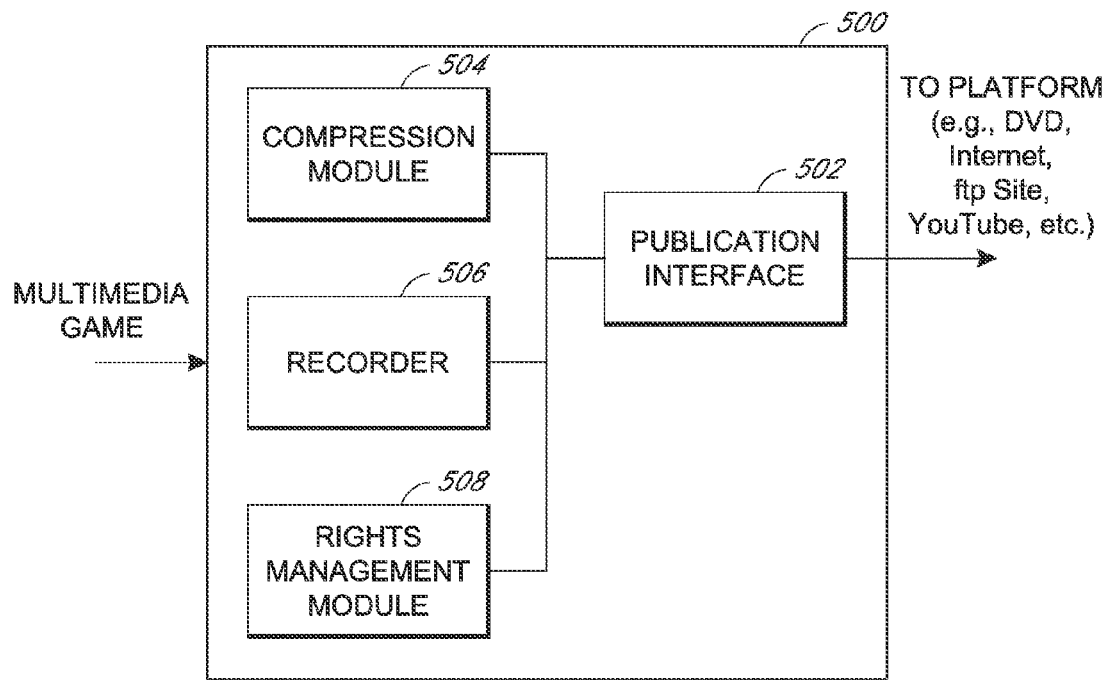
FIG. 5 illustrates a functional block diagram for an example of a publication system.

FIG. 5 illustrates a functional block diagram for a publication system. In an interactive network environment, the publication system 500 may provide the completed multimedia game via a central server. In some implementations, the publication system 500 may be configured to automatically publish the games to an external site. For example, an author may produce a game for a corporation. The author may provide information indicating the location of the corporate server to host the game. Upon receipt of a signal to publish the game, the publication system 500 may transmit the game to the associated server. The publication system 500 may also be configured to publish the game via channels such as YouTube channels. In such an implementation, the publication system 500 may receive information indicating the channel to publish a game (e.g., login, password, host). In some implementations, the publication system 500 may be configured to compile the multimedia game or otherwise generate an executable form of the multimedia game for distribution. The publication system 500 may include a publication interface 502 to manage the communications with the diverse platforms.

The publication system 500 may include a compression module 504. The compression module 504 may be configured to generate a final version of the game appropriately compressed for the target publication platform. As discussed above, the needs for a high-definition game are different than the needs for a low-bandwidth game. Accordingly, the compression module 504 may generate one or more versions of the game for publication depending on the selected publication platforms.

The publication system 500 may include a recorder 506. In some implementations, the multimedia game will be included on a recorded media such as a DVD or Blu-Ray disc. In such implementations, the recorder 506 may be configured to provide the appropriately formatted multimedia game for the target media.

The publication system 500 may include a digital rights management module 508. The digital rights management module 508 may be configured to assign and enforce the rights governing the use of the multimedia game. The digital rights management module 508 may be configured to generate and assign digital rights management information for the game during the publication process. The rights information may be embedded in the game or associated therewith (e.g., license key).

When the game is played, the digital rights management module 508 may receive requests prior to starting the game to determine if the game can be played. The request may include the location of the player, time information, a value identifying the game requested, license key information, player identity information, and the like. Based at least in part on the request information, the digital rights management module 508 may prevent the playing of the game. Similarly, an authentication module (not shown) may determine whether player is permitted to play the game based on, for example, the player's identity information The publication system 500 may include a QR code generator. The QR code generator may generate a unique QR code for a game based on, for example, the game identifier, the digital rights for the game, and the like. For example, printed materials can feature QR code that represents a link to a particular game. When a player takes a snapshot photo of such QR code with the camera on her smartphone this game will be directly displayed on the phone's screen so that she will be able to play it.

In some implementations, publication may include hosting the multimedia game for playing. For example, the multimedia game may be centrally authored and hosted. A unique identifier may be provided to other systems which can be used to access and present the game transparently on the other systems. For example, a game may have a unique resource indicator. Using an iFrame, for example, on a website which specifies the hosting server and the unique resource indicator for the game of interest, the website may include the game as if it were hosted by the website.

With the game published, players may access the game and begin playing. Valuable information may be collected regarding who is playing the game, where the player is located, what they know based on a current gaming session, history of past gaming sessions, and how their knowledge is changing over multiple gaming sessions. To collect and analyze this information, a game monitoring system 600 may be included.

Figure 6:
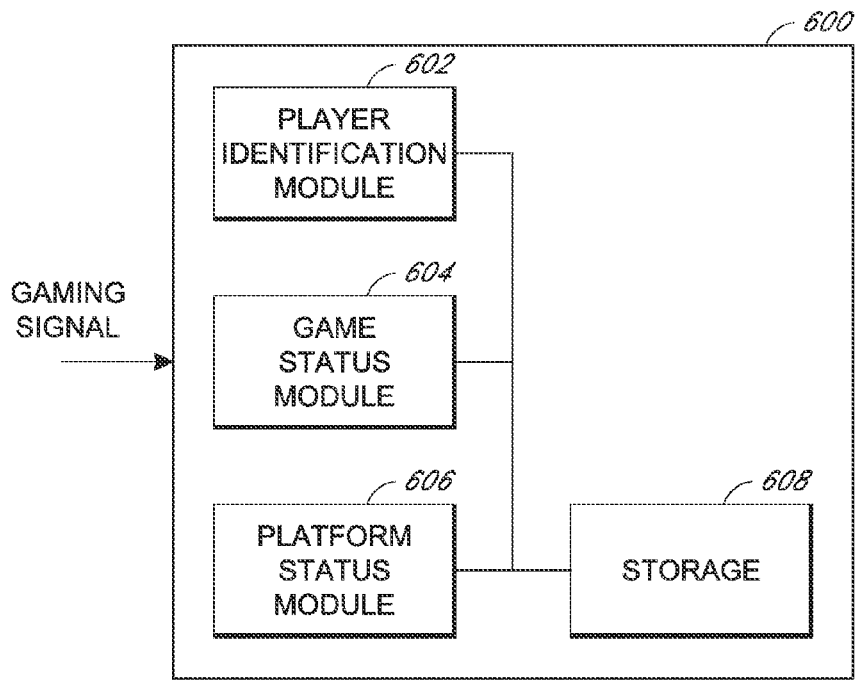
FIG. 6 illustrates a functional block diagram for an example of a game monitoring system.

FIG. 6 illustrates a functional block diagram for an example of a game monitoring system. The game monitoring system 600 may be configured to monitor interactions with published multimedia games. The game monitoring system 600 may be configured to receive one or more signals regarding a game. The signals may be received prior, during, or after the game is played. The signals include information about the gaming session such as player information, game information, platform information, and location information.

The game monitoring system 600 may include a player identification module 602. The player identification module 602 may be configured to identify the player of a particular game based on the one or more signals received regarding the game. In some implementations, the players may register to play the game or may need to be authenticated before they are permitted to play the game. In such implementations, the player identification module 602 may obtain the player information from a player database (e.g., storage 608). The registration information may include demographic information (e.g., age, race, occupation, income), preferences, and other data about the player. This information may be provided as part of the registration process. This information may be generated based at least in part on the games played. For example, if the player prefers to play games based on baseball content, the player may be identified as a sports enthusiast. The player identification module 602 may prevent the player from accessing the game, e.g. in cases where an educational or training game is to be played only by students registered for a course or restricted for only internal use by the employees of a specific enterprise.

In some implementations, the players may play the game anonymously. In such cases, the signals received regarding the game may include some identifying information which can be used to identify the player. For example, for an HTTP based game, the HTTP header information may include an IP address. IP addresses are generally associated with a particular geographic location. This geographic location information may be used as an identifying characteristic for a user. Furthermore, certain IP addresses may be assigned to companies. As such, an employee of a company with such an assigned IP address may be identified.

In some implementations, the players may play the game pseudo-anonymously (e.g., no registration, but must permit tracking cookies). The signals received may include information from the tracking cookies. The player identification module 602 may be configured to process the cookies to determine identifying attributes of the player. In some implementations, cookies and/or other local storage media can be used to store the information about the past game sessions. The past information can be offered to the player when returning to play another game. This way the player can receive points and rewards from past sessions while the database can be enriched by past performance data.

The game monitoring system 600 may include a game status module 604. The game status module 604 may be configured to receive information about the actions taken by a player for a given gaming session. For example, each response to a task may be transmitted to the game status module 604. The response may include the input for the selected task (e.g., multiple choice, answer selection, object identification) and the time to provide the response. Additional games status information may include game start time, game end time, the total time playing the game, whether the game was completed or aborted, and the like. The received game status information may be stored in a storage 608 associated with the game monitoring system 600. The game status module 604 may communicate the status to an external system. For instance, a web site that integrates a game within an iFrame can use the status information to display offers and rewards based on the player's performance in solving the game tasks. Such notification about the game status may be provided through an API (Application Programming Interface).

The game monitoring system 600 may include a platform status module 606. The platform status module 606 may be configured to receive information about the platform on which the game is being played. For example, for a web-based, the platform status module 606 may determine device characteristics for the device executing the game based on the HTTP header information. Device characteristics may include the device type (e.g., laptop, mobile, tablet, desktop), processor, operating system, and web-browser type.

In some implementations, the platform status module 606 may receive information regarding the status of the platform executing the game. For example, whether accessories are attached to the device, whether the device is operating on a wireless protocol, which wireless protocol being used (e.g., cellular or broadband), and the like. The platform status information may also include background information for the platform such other applications running while the game is being played (e.g., music players, video players), power mode for the device (e.g., full power, reduced power, standby), and the like. The received platform information may be stored in the storage 608 associated with the game monitoring system 600.

On portable platforms, such as cell phones, tablets and laptops, the status information may include the location information. This location information can be used to offer location-specific games, location-specific multi-player games, and location-specific rewards. For instance, a player can be offered games based on trailers for movies shown in a nearby movie theater. In multi-player game implementation, a player can be invited to join a game session played by competitors in the same shopping mall. A restaurant can offer a free desert to a player playing a game in a coffee shop nearby. Moreover, aggregate information about games played at specific locations analyzed with respect to the players' performance may provide valuable marketing research information.

The game monitoring system 600 may include an accounting module 608. The accounting module 608 may be configured to generate accounting information for the games. For example, in a marketing context, the number of times a particular game is played may be referred to as an impression. The number of impressions for a given game has a monetary value as it represents an opportunity to interact with a potential customer. Similarly, the number of times players clicked on link leading to another web site—a click-through rate—and the time they spent viewing the content there represent valuable market research information. The accounting module 608 may be configured to generate one or more metrics based on the received player, game, and platform information. These metrics may in turn be used to efficiently monetize a game and/or the underlying content serving as the basis for the game. For example, the game author may have a licensing deal to use a particular piece of content. The terms of the licensing arrangement may be based on a metric from the accounting module 608 (e.g., total time played, number of unique players).

The game monitoring system 600 as shown in FIG. 6 may generate a wealth of information about players, the games they play, and the platforms on which they are being played. This information may be stored in a storage and analyzed for a variety of purposes.

The information generated may be used in an educational setting to track student progress. For example, identifying which games have been played by a student can indicate which topics the student is interested in. The actions taken by the student can be assessed to determine whether the student is grasping the subject matter. For instance, if a student is answering correctly and very quickly, it may be determined that the student needs a more challenging exercise. However, if a student is consistently answering incorrectly or taking a long period of time, special attention may be provided to the individual student. As another example, as recorded lectures are enhanced with game tasks human judgment and/or data analytics can classify the lectures along different dimensions, such as pace, clarity, and style of presentation. If the analysis of the player's task performance shows that it may be best to repeat a portion of the lecture or skip a portion of the lecture, the authoring system may be configured to suggest and/or automatically add the continuation point.

In an educational setting, the information may be further aggregated to provide feedback on content and/or instructor effectiveness. For example information mined from the results of playing the games by many players give also information about the quality of the lectures so that lousy lectures can be weeded out and excellent ones remain. Moreover, the information can be used to cluster students into groups with similar learning styles and cluster game-enhanced lectures (and networks) to offer the best (e.g., the shortest) paths towards mastering subject knowledge.

As described above, based on the result of a game (and history of playing games by an individual player), control may continue at another time point in another video. Lectures that cater to different style of learning, e.g., adapted to faster or slower pace of learning, to more abstract vs. more concrete, example-rich, visual, fun vs. dry presentation, etc. may be recorded and used to generate a game for different learning styles. For example, recordings of lectures from different universities may be tied together in a network and a learner who is guided through the network playing games that test and enhance her knowledge so that she masters a subject in the most efficient (and engaging) manner. Such a network can be published as static or dynamic (e.g., based on student's grasp of prerequisites and past performance) game-based textbook that organizes related lectures and games into chapters and sections.

As described above, the educational context has been discussed as a classroom context. It will be understood that the techniques described herein may also be applied to training content such as employee training videos.

In a marketing context, the information may be used to identify popular games. The popularity of a game indicates how many people are engaging with a particular game. Popularity of a game may be based on the number of plays, the number of repeats, the total game play time, or other metric determined from the information from game monitoring system 600.

In some implementations, the performance data collected can be mined to obtain information about what the player knows about a brand or a product. For example, the game can contain a brand- or product-specific task(s) that reveal how familiar the player is with the brand or product, such as quiz questions about the horsepower of a sports car. Aggregate data can be filtered by demographic categories and accumulated according to weighted tasks and over weighted games to answer, for instance, such questions as "How many smart (IQ>120) female teenagers in Hawaii know that Restaurant A now offers such healthy food as veggie-burger and acai juice?" based on correct answers in a game where only tasks 3 and 5 were weighted as 50% as only these tasks contained quiz questions about veggie-burger and acai juice.

Since the game monitoring system may receive information about how long it took the player to solve a task, data analytics can determine whether the player made a "spur of the moment" decision or a "rational" decision based on more careful decision based on her knowledge of important facts. This data can be used to classify tasks as well as players into "degrees of rationality." Performance over numerous games can show at which point a player did not have to rationally think about tasks anymore but used a spur of moment decision. Data analysis can be filtered by demographic aspects to examine and contrast individual and shared knowledge useful, for instance, for cultural analysis of content when a Western car company introduces a new model in the Asian markets.

Additionally, over time, a player's change in knowledge about the brand may be tracked by analyzing subsequent gaming sessions. For example, on the first play, a player may take a long time to correctly identify the product's slogan. However, over time, the speed with which the player identifies the slogan may increase. This increase shows that a particular advertisement has been effective in building brand recognition. Conversely, no change or a decrease in response time can be used to identify campaigns that are not working.

Furthermore, authors or teams producing popular games may be identified. The act of authoring requires interaction with the branded content. Incentives may be offered as a marketing strategy to encourage more authors or teams to develop games based on a particular piece of content which may bring association to the brand.

A marketer may reward the private authors of a game that became the most popular. For instance, an advertiser can produce a video featuring a brand or a product and let authors create games accompanying this video and reward the best authors. Similarly, the advertiser can post numerous tasks and let the authors create the video, split it into the segments and associate the tasks with the segments. A manufacturer may simply post information about a new product and let the authors produce entire games (e.g., the video as well as the associated tasks distilled from the posted information). In such campaigns, the costs of rewards for the best authors incurred by sponsor may be dynamically configured to a predetermined threshold (e.g., less than an alternative/traditional advertising campaign).

The information from game monitoring system 600 may be used to suggest additional games to an identified player. For example, if a player spends time playing a first game based on classic movies, the game monitoring system 600 may identify additional games related to classic movies that may be of interest to the player. In such an implementation, the multimedia game may include an interface for dynamically suggesting additional games to play at the conclusion of a game. The suggestions may also be defined as part of the multimedia game, as discussed above. Direct questions about player's opinion about a subject, such as the quality of a product, may be included as part of the multimedia game.

Tasks can also be formulated as questions about how many people did answer a subject-related question with "yes" or "no". Data mining then can reveal their own opinion about the subject as this opinion is directly influenced by their guess about the opinions of other people.

Aggregated game information may also be used to implement multiplayer environments. For example, a leader board may be generated identifying the top scoring players for a particular game. Rewards or other incentives may be provided to the top scoring players. Multiplayer environments may also allow players to play against each other. For example, the game information may identify two players as playing the game in the same location (e.g., in a restaurant). The game information may identify the players and pit them against each other for a promotional prize (e.g., restaurant coupon).

In one or more of the implementations described above, various statistical analyses may be included to suggest or determine which tasks should be presented within a game. For example, statistical cluster analysis of information received by the game monitoring system can be used to determine which tasks are very likely to produce the same responses. In the context of marketing research, it may be important to reduce the frequency of tasks from within the same cluster as they add little new information about the player's knowledge or opinion. Games can be adapted either by an author or automatically to eliminate and/or reduce the frequency of clustered tasks.

Statistical cluster analysis may be included to provide information about the players. If a cluster of players whose demographic information is not known gives similar answers to another cluster whose demographic information is known to be similar then database can be populated with deduced demographic information about the former players. For instance, if the cluster of players answering a question correctly has predominantly reached college educational level, then it is likely that a player who answers this question correctly as well has similar educational background.

Similarly, unknown demographic classification can be narrowed down with targeted tasks that are likely to be solved correctly by a player within a specific demographic class. For example, it is quite unlikely that an average American knows the capital of Bangladesh while a European who knows the capital of Idaho is a rarity. Similarly, there are comparably few baby boomers who know the life story of most rap musicians while most teenagers would not know who the first Beatles drummer was. Accordingly, by including such tasks in a game, aspects of the demographic information for an unknown player may be determined.

In some implementations, the content may include a previously recorded television program such as a game show. For example, old quiz shows may be enhanced with tasks thereby converting the viewer into a player of the game. The task may be a multiple choice question to which the user must answer within a certain period of time. The result for a response may be authored to track the scoring used in the game. For example, receive the appropriate points for a correct answer or deduct the appropriate points for an incorrect answer. In such an implementation, it may be desirable to provide additional visual elements to make the player feel as if they are on the game show. These additional visual elements may include color schemes, formatting of the task information, formatting of the response information, incorporation of sound elements, and the like.

In some implementations, the content may be a movie or another video recording distributed on DVD. Similar to a subtitles track, such a DVD can contain one or more game tracks. Besides predetermined tasks, tasks can be produced automatically, e.g. from a subtitle tracks in different languages. For instance, words in English subtitles can be left blank and the viewer can be presented with a choice of words from the Spanish subtitles, thus producing a game that teaches foreign language vocabulary.

In some implementations, recordings of TV programs can be enhanced by a game one or more tracks that identify synchronize starting and end time points of a segment with game tasks to be solved via interaction with such input devices as remote controls, cell phones, TV set top boxes and smart TVs. Future programs can be produced which include such game tracks. As discussed herein, live programs, such as sports events, can be broadcast together with game tracks created by authors who define game tasks in real time.

In some implementations, the content may include a legally binding oral or written agreement, such as a Terms of Use or an End User License Agreement. For example, to access certain services or content, the requester must assent to a user agreement before accessing the service or content. In some implementations, the agreement may be presented in a multimedia presentation with the time segmented tasks defined along the way for the requester to respond to. The responses can be used to show the responder viewed the content. The responses can also be used to show that the responder understood the content (e.g., based on one or more correct responses). The responses for such implementations may be stored using a secured mechanism to ensure that the responses are reproducible in a trustworthy manner. For example, the responses may be received over a secure connection and stored with a digital signature. In some implementations, the content may be derived from information found on a company's website—the "About Us" section, a blog, a news item, or a quiz highlighting the experience of its management team.

Games based on job offers may be created. For example, applicants may play a game including tasks that may occur in course of fulfilling their job duties. Similarly, the vision and mission of the company can be presented in a game format, e.g. a company producing educational games can offer quizzes asking the meaning of the motto "Scuola Ludus", i.e., "school as game".

In some implementations, the content may include a video demonstrating the application of a patented technology along with a quiz highlighting the patented ideas and explain the meaning of the claims. Such games may be used to promote the commercialization of the ideas or to deter their use in competitors' products. Similarly, the content highlighting a company's product, its clients and the expertise of its management team can be employed to promote the company to potential investors.

In some implementations, a game can integrate tasks taken from professionally accepted tests, such as Rorschach test which may be used by psychologists to determine person's personality characteristics. Similarly MENSA-like tests can give information about the players' IQ. These tests may be monitored by the game monitoring system and provide further classification of players into new demographical categories.

In some implementations, the game may be used to determine whether a person is playing the game or if an automated entity is accessing the game (e.g., robot). For example, to identify whether a game is played by human being or a software "bot" that only simulates clicks a so-called "CAPTCHA" game can be used. Such a game has just few tasks whose solutions are trivial for a human but very difficult for a bot. An example is a task that shows a video and asks whether an object is moving from left to right, right to left, upwards, downwards or diagonally. The task may be defined so as to further distinguish human from non-human players by asking the question in spoken rather than written form.

Figure 7:
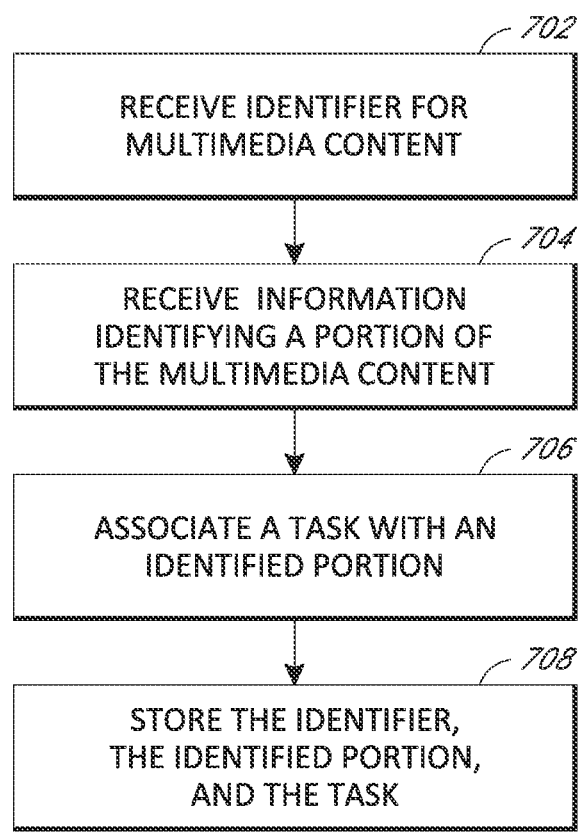
FIG. 7 illustrates a process flow diagram for a method of generating a multimedia game.

FIG. 7 illustrates a process flow diagram for a method of generating a multimedia game. The method shown in FIG. 7 may be implemented in whole or in part by one or more of the devices described above. In some implementations, the method may be computer implemented. At node 702, an identifier for multimedia content for the multimedia game is received. At node 704, information identifying a portion of the multimedia content is received. At node 706, a task is associated with an identified portion of the multimedia content. At node, 708, the identifier, the identified portion of the multimedia content, and the task for the multimedia game are stored.

Figure 8:
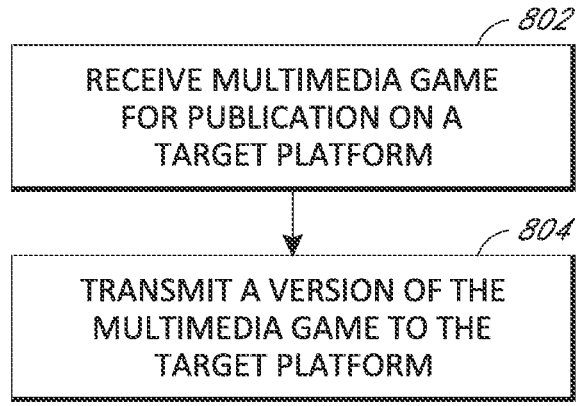
FIG. 8 illustrates a process flow diagram for a method of publishing a multimedia game.

FIG. 8 illustrates a process flow diagram for a method of publishing a multimedia game. The method shown in FIG. 8 may be implemented in whole or in part by one or more of the devices described above. In some implementations, the method may be computer implemented. At node 802, the multimedia game for publication on a target platform is received. The multimedia game includes multimedia content and a task associated with an identified portion of the multimedia content, wherein the task includes information identifying a task response receiver. At node 804, the version of the multimedia game is transmitted to the target platform.

Figure 9:
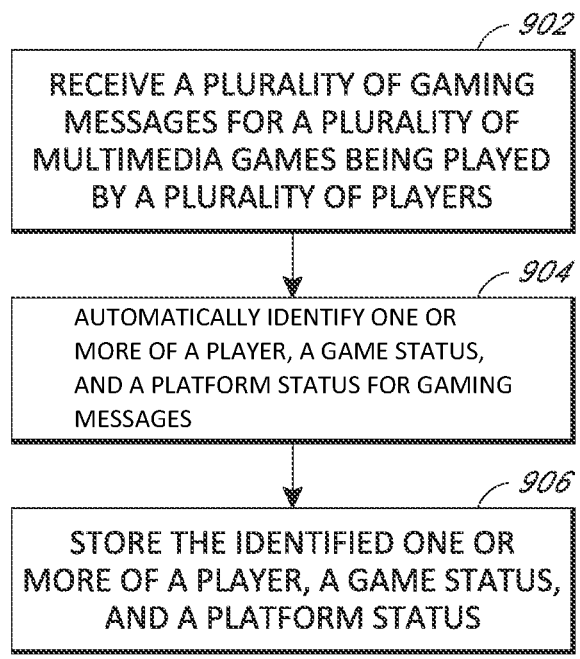
FIG. 9 illustrates a process flow diagram for method of a monitoring concurrent multimedia gaming.

FIG. 9 illustrates a process flow diagram for method of a monitoring concurrent multimedia gaming. The method shown in FIG. 9 may be implemented in whole or in part by one or more of the devices described above. In some implementations, the method may be computer implemented. At node 902, a plurality of gaming messages for a plurality of multimedia games being played by a plurality of players are received. Each multimedia game includes multimedia content and a task associated with an identified portion of the multimedia content, wherein each gaming message includes a timestamp and information about a gaming session. At node 904, one or more of a player, a game status, and a platform status for each gaming message are automatically identified. At node 906, the identified one or more of a player, a game status, and a platform status for each gaming message are stored.

Having thus described various aspects which may be included in a multimedia time-segmented gaming system, one non-limiting example of the integration of several aspects to provide a multimedia time-segmented game based on a live content stream will be discussed.

The content for a live content stream may generally be captured by one or more cameras and microphones. The images may be processed and transmitted (e.g., cable, satellite, over the air, Internet) for viewing. The content may be presented in different mediums such as televisions, smartphones, laptops, and the like. The multimedia gaming system may be included to provide gaming elements to the live stream thereby enhancing the viewer experience as well as increasing the opportunities to present information to the viewer beyond what has been captured (e.g., statistics, advertisements, contextual information). For example, in some non-limiting aspects the multimedia gaming system may be included between the capture but prior to transmission.

As an example, consider a live sporting event such as a soccer match. As the video stream is captured by the cameras and microphones (or as a live stream is captured by as it is transmitted or broadcast, for example, via the internet, cable or television signals), the signals representing the content stream, in whole or in part, may be provided to a preprocessor as described above. The preprocessor may identify at least three layers of content in the soccer stream: a video component representing the visual images of the game, an audio component corresponding to the sounds of the game, and a textual component representing the closed captioning provided for the game.

In some implementations, the system may identify multiple objects and/or themes for a given time segment. For example, within a thirty second period (or any other desired period of time) of game play, the content may show a close-up shot of a player, a wide view of the field, a stock photo of a coach, and a pan of the crowd. The video extractor may analyze the frames and identify the players through facial recognition. This information may be stored as other aspects of the content are analyzed. The scene extractor may identify four segments within the thirty second clip: close-up, wide view, stock photo, and pan. The audio extractor may perform voice analysis of the commentary during which the announcer discusses the player, the weather during the match, the coach's legacy, and the excitement of the crowd. The voice analysis may convert the audio into text and provide this text to the textual preprocessing units. The textual preprocessing units may identify themes based on a threshold of references. For example, in discussing the player shown, the announcer may compare the player in passing to another player. The theme of the portion may provide more weight to concepts that are repeated such as the shown player's name as compared with the comparison player's name. In this way, a ranked list of themes may be generated.

Identifying the appropriate tasks may be accomplished based at least in part on the identified scenes, objects, and themes. In some implementations, multiple games may be provided for the same live stream. For example, the scenes, objects, and themes may be categorized such that the ranking may favor sports tasks. In this way, a game tailored to a sport fan may be generated. Similarly, the scenes, objects, and themes may be categorized such that the ranking may favor human interest tasks. In this way, a game tailored to a non-sports fan may be generated.

The tasks selection may also be based on advertising agreements. For example, advertisers may pay to have their task or promotional message in the form of a caption inserted into the game. Systems for automatic bidding for advertising space based on one or more of the content, the player, and the platform may be included as part of the task selection. For example, a sports energy drink company may sponsor a task. The company can indicate a value of a particular impression (e.g., how much they would pay to have this message presented to a certain player, during certain content, on a certain device). The task selection scheme may integrate this information to identify the highest bidder for a given point in the content for a task.

The tasks may be stored in a storage medium or apparatus, such as a database. The system may access the storage to identify a task for the top ranked theme. In some implementations, once a task has been used, the system may associate an indicator of when the task was used. This can help ensure that tasks are not repeated too often. Once selected, the task may be associated for a fixed period of time. For example, the storage may include, along with the task information, a task completion duration identifying the amount of time a viewer has to complete the task. In some implementations, the task may not have a completion time. In this case, the system may allow the viewer to respond to the task until a new task for a different clip has been identified.

The task and associated game information may then be associated with the portion of the live stream. In some implementations, the game information is transmitted with the content. In some implementations, the game information is transmitted separately from the content. As discussed above, there may be multiple tasks for different viewer types included. In this implementation, the multiple tasks may be transmitted with or separately from the content.

When the content and game information arrive at the viewer device, the task is associated with the content such that when the viewer watches the thirty-second clip, the selected task is shown. As the scene plays, the viewer may have an opportunity to use the game interface to complete the task. For example, the task may be to answer a multiple choice question about the player. If presented on a tablet computer, for example, the user may input via a touch screen a response. If presented on a laptop or desktop computer, the choice may be indicated using a mouse and/or keyboard. If presented on a set top box, the choice may be received via a remote control. If presented on a device including a microphone, the choice may be received audibly. As another example, the task may be to make motions get excited such as to mirror the crowd portion of the clip. The task may include making noise or motions which may be captured by a microphone and or camera associated with the system.

The game delivery event may trigger a signal to be sent to the game monitoring system. The signal may be transmitted when the multimedia game is transmitted, when the multimedia game is delivered to the platform, when the game starts, or at another appropriately determined time. In this example, the trigger signal may include one or more of content information (e.g., what the content is, content category (e.g., sports, news, leisure), multimedia game identifier, platform information regarding the device rendering the game, and player information identifying who is playing the game. In some implementations, the player may be identified when the platform is initialized. For example, in the live stream scenario, a user may select a profile which identifies the person watching the content. This profile may include multimedia game system information which uniquely identifies the player.

As the task is presented to the viewer, one or more signals may be transmitted to the game monitoring system. The signal may originate with the device playing the game or the device controlling the game play. The game monitoring system may be configured to process the signals and store the information about the game session.

As the soccer match continues, additional tasks may be identified as described above. In some implementations, if no clear theme can be identified, the system may be configured to select a general task. The general task may be based on one or more of the content type (e.g., sports, news, leisure), the player, the platform, and the like. The additional tasks may also be selected based on the responses to the previously presented tasks. For example, if a player is presented with a question regarding a particular product and the player responds incorrectly, a subsequent task which may provide the information in a different format may be presented. In this way, the user can be "taught" about concepts or products. The game monitoring system may provide some or all of the information to identify such learning patterns.

The game monitoring system may further capture the speed with which responses are received. For example, how fast the keyboard response is received may be included in the game information signal transmitted to the game monitoring system. As discussed above, this reaction time information may be stored and used for subsequent processing such as selecting tasks, analyzing the player's knowledge, analyzing the player's learning over time, and aggregated to identify broader player patterns (e.g., preferences, overall campaign effectiveness). The speed information can be presented to the players, for instance in form of scored points, to enhance their engagement with the content.

In an implementation where the content is pre-recorded content, such as a quiz game show, a similar process may be implemented. The quiz game show may include a host and several contestants. The host may ask questions and the contestants must respond. The content may be provided to the system on a recorded storage medium, hard disk, Internet, or other form. The preprocessor may identify the video component of the content. In the example of a quiz game show, this may include shots of the host asking the question, shots of the players thinking and/or answering, and commentary on the question after an answer by the host. The video preprocessor may be configured to extract time-segments identifying each question and response answered. The audio processor may be configured to extract the question and answers provided. These segments may be stored in a storage for later use in authoring the multimedia game.

Similarly, the objects may be identified in the video component. Objects may include facial recognition, such as the host. These objects may also be stored in the storage for use during game authoring.

In some implementations, the video component may have been shot using older video equipment. As such, there may be graininess to the content. The video converter may be configured to adjust the video component to clarify the graininess. Similarly, the video component may have been shot using black and white. The video converter may be configured to apply a colorization scheme for the video.

The authoring system may be accessed by an individual associated with a team. The individual may select the various suggested time segments for the game. The individual may also assign a task to each quiz show question. The individual may further indicate responses for the task. The game may be saved for additional authoring. A different individual on the same team may continue the authoring process. For example, the different individual may change a response for a task associated with a time segment, define a new time segment, and/or assign a different task to an existing time segment.

Once the game has been authored, the publication system may provide the game for playing. For example, the publication platform may be configured to compile the game into a home video format (e.g., DVD, Blu-Ray). Accordingly, the quiz show game may be packaged as a vintage television program including new interactive content. In this example, the publication system may be configured to generate an appropriate encoding of the game information (e.g., additional track, additional angle) and record a media for playing. In some implementations, the quiz show may be provided via a network. In this case, the game information may be stored and re-joined with the multimedia content when accessed, such as via a website.

Regardless of the platform, as described above, various inputs may be received by the system and monitored using the game monitoring system.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof.

What is claimed is:

1. A device for generating a multimedia game comprising:
   a receiver configured to receive an identifier for multimedia content for the multimedia game;
   a segment selector configured to:
   determine a content source of the multimedia content based on the identifier,
   retrieve the multimedia content from the content source through a network interface, and
   identify a plurality of portions of the multimedia content and at least one object referenced in a corresponding portion of the multimedia content based at least in part on audio or video analysis of the multimedia content;
   wherein the audio analysis consists of an analysis of at least one of peak analysis, repetition analysis, or volume analysis;
   wherein the video analysis consists of an analysis of at least one of scene change analysis, pixel analysis, or frame analysis;
   a tasking circuit configured to:
   receive a portion identifier for a portion of the plurality of portions of the multimedia content,
   receive task information to associate with the portion identified by the portion identifier, the task information defining a task to present during playback of the portion of the plurality of portions,
   wherein the task consists of at least one activity for a game player to perform during playback of the portion of the plurality of portions, wherein the task is associated with an object identified in the portion, and wherein the task accepts input from at least one input device associated with the game player;
   wherein the at least one input device consists of at least one of a keyboard, a camera, a microphone, a remote control, an accelerometer, a thermometer, 3D eyewear, 3D helmet, a mouse, a touchscreen, or a haptic suit; and
   generate a record associating the portion identifier, the task information, and the identifier;
   a memory configured to store the record; and
   a transmitter configured to publish at least one version of the multimedia game to a target platform, wherein the transmitter is configured to convert the multimedia game from a first format to a second format, adjust a video quality of the multimedia game, adjust an audio quality of the multimedia game, and compile the multimedia game into an executable form;
   wherein the receiver is further configured to receive a game play request including an identifier for the multimedia game and digital rights information associated with the multimedia game; and
   wherein the transmitter is further configured to transmit a game play response indicating whether a play of the requested multimedia game is permitted based on a comparison between the received digital rights information with a second digital rights information associated with the received identifier.

2. The device of claim 1, wherein the identifier for the multimedia content includes one or more uniform resource locators identifying a location of media components of the multimedia content.

3. The device of claim 1, further comprising a processor, the processor configured to obtain one or more of a location of the multimedia content and a task for a portion of the multimedia content from the memory.

4. The device of claim 1, wherein each of the plurality of portions of the multimedia content includes information identifying a start time and an end time for the portion.

5. The device of claim 1, wherein the task includes one or more of a multiple choice question, a fill-in-the-blank question, an audio response activity, identification of an element included in the multimedia content, a connect-the-dot problem, a video response activity, a gesture response, a subsequent task for presentation upon completion of the task, and a pre-requisite task for presentation prior to the task.

6. The device of claim 1, wherein the plurality of portions of the multimedia content are identified based on a characteristic of the multimedia content.

7. The device of claim 6, wherein the characteristic includes at least one of color level, color location, audio waveform, audio volume, pixel content, video frame rate, and textual information associated with the multimedia content.

8. The device of claim 1, further comprising a captioning circuit configured to associate a caption with the portion identified by the portion identifier.

9. The device of claim 1, wherein the receiver is further configured to receive one or more media components, the one or more media components arranged as the multimedia content for the multimedia game.

10. A computer-implemented method of generating a multimedia game, the method comprising:
    receiving an identifier for multimedia content for the multimedia game;
    receiving a game play request including an identifier for the multimedia game and digital rights information associated with the multimedia game;
    determining a content source of the multimedia content based the identifier;
    retrieving the multimedia content from the content source through a network interface;
    identifying a plurality of portions of the multimedia content and at least one object referenced in a corresponding portion of the multimedia content based at least in part on audio or video analysis of the multimedia content;
    wherein the audio analysis consists of an analysis of at least one of peak analysis, repetition analysis, or volume analysis;
    wherein the video analysis consists of an analysis of at least one of scene change analysis, pixel analysis, or frame analysis;
    receiving a portion identifier for a portion of the plurality of portions of the multimedia content;
    receiving task information to associate with the portion identifier, the tasking information defining a task to present during playback of the portion of the plurality of portions;
    wherein the task consists of at least one activity for a game player to perform during playback of the portion of the plurality of portions, wherein the task is associated with an object identified in the portion, and wherein the task accepts input from at least one input device associated with the game player;
    wherein the at least one input device consists of at least one of a keyboard, a camera, a microphone, a remote control, an accelerometer, a thermometer, 3D eyewear, 3D helmet, a mouse, a touchscreen, or a haptic suit;
    generating a record associating the portion identifier, task information, and the identifier;
    storing the record in a memory;

publishing at least one version of the multimedia game to a target platform, wherein the transmitter is configured to convert the multimedia game from a first format to a second format, adjust a video quality of the multimedia game, adjust an audio quality of the multimedia game, and compile the multimedia game into an executable form; and transmitting a game play response indicating whether a play of the requested multimedia game is permitted based on a comparison between the received digital rights information with a second digital rights information associated with the received identifier.

11. The method of claim 10, wherein the identifier for the multimedia content includes a uniform resource locator identifying a location of one or more media components of the multimedia content.

12. The method of claim 10, further comprising obtaining one or more of a location of the multimedia content and a task for a portion of the multimedia content from a memory.

13. The method of claim 10, wherein the task includes one or more of a multiple choice question, a fill-in-the-blank question, an audio response activity, identification of an element included in the multimedia content, a connect-the-dot problem, a video response activity, a gesture response, a subsequent task for presentation upon completion of the task, and a pre-requisite task for presentation prior to the task.

14. The method of claim 10, wherein the plurality of portions of the multimedia content are identified based on a characteristic of the multimedia content.

15. The method of claim 10, further comprising receiving one or more media components, the one or more media components arranged as the multimedia content for the multimedia game.

16. A non-transitory computer readable medium including instructions executable by a processor of a device, the instructions causing the device to:

receive an identifier for multimedia content for a multimedia game;

receive a game play request including an identifier for the multimedia game and digital rights information associated with the multimedia game;

determine a content source of the multimedia content based on the identifier;

retrieve the multimedia content from the content source through a network interface;

identify a plurality of portions of the multimedia content and at least one object referenced in a corresponding portion of the multimedia content based at least in part on audio or video analysis of the multimedia content;

wherein the audio analysis consists of an analysis of at least one of peak analysis, repetition analysis, or volume analysis;

wherein the video analysis consists of an analysis of at least one of scene change analysis, pixel analysis, or frame analysis;

receive a portion identifier for a portion of the plurality of portions of the multimedia content;

receive task information to associate with the portion identifier, the task information defining a task to present during playback of the portion of the plurality of portions;

wherein the task consists of at least one activity for a game player to perform during playback of the portion of the plurality of portions, wherein the task is associated with an object identified in the portion, and wherein the task accepts input from at least one input device associated with the game player;

wherein the at least one input device consists of at least one of a keyboard, a camera, a microphone, a remote control, an accelerometer, a thermometer, 3D eyewear, 3D helmet, a mouse, a touchscreen, or a haptic suit;

generate a record associating the portion identifier, task information, and the identifier; and store the record in a memory;

publish at least one version of the multimedia game to a target platform, wherein the transmitter is configured to convert the multimedia game from a first format to a second format, adjust a video quality of the multimedia game, adjust an audio quality of the multimedia game, and compile the multimedia game into an executable form; and transmit a game play response indicating whether a play of the requested multimedia game is permitted based on a comparison between the received digital rights information with a second digital rights information associated with the received identifier.

17. The non-transitory computer readable medium of claim 16, wherein the identifier for the multimedia content includes a uniform resource locator identifying a location of one or more media components of the multimedia content.

18. The non-transitory computer readable medium of claim 16, wherein each of the plurality of portions of the multimedia content includes information identifying a start time and an end time for the portion.

19. The non-transitory computer readable medium of claim 16, wherein the task includes one or more of a multiple choice question, a fill-in-the-blank question, an audio response activity, identification of an element included in the multimedia content, a connect-the-dot problem, a video response activity, a gesture response, a subsequent task for presentation upon completion of the task, and a pre-requisite task for presentation prior to the task.

20. The non-transitory computer readable medium of claim 16, wherein the instructions further cause the device to receive one or more media components, the one or more media components arranged as the multimedia content for the multimedia game.

* * * * *